No. 823,803. PATENTED JUNE 19, 1906.
C. D. MONROE.
APPARATUS FOR MELTING AND PURIFYING BUTTER AND FATS.
APPLICATION FILED SEPT. 18, 1905.
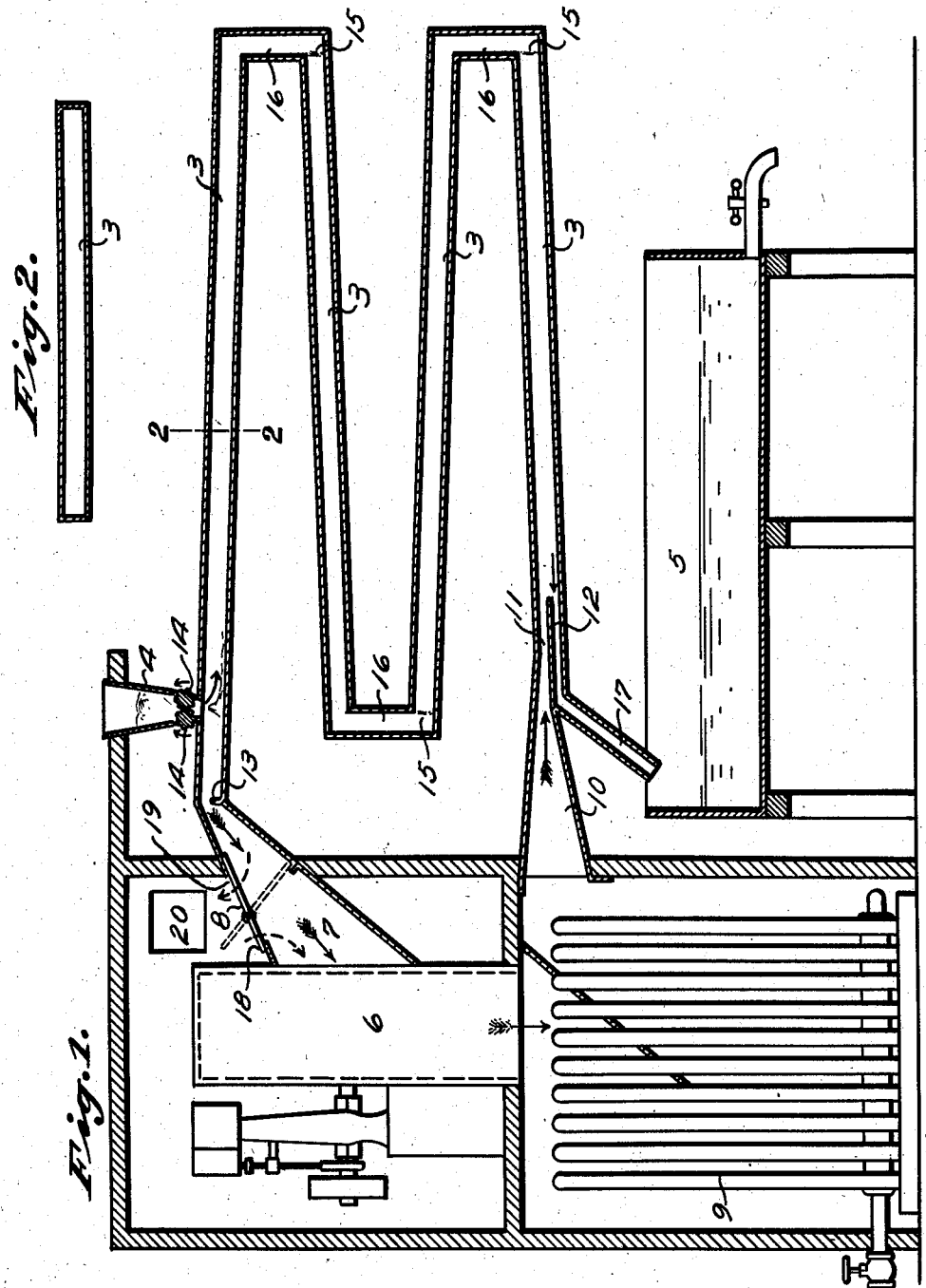

UNITED STATES PATENT OFFICE.

CHARLES DALLAS MONROE, OF ELGIN, ILLINOIS, ASSIGNOR TO AMERICAN FARM PRODUCTS COMPANY, A CORPORATION OF NEW JERSEY.

APPARATUS FOR MELTING AND PURIFYING BUTTER AND FATS.

No. 823,803.  Specification of Letters Patent.  Patented June 19, 1906.

Application filed September 18, 1905. Serial No. 279,004.

*To all whom it may concern:*

Be it known that I, CHARLES DALLAS MONROE, a citizen of the United States of America, and a resident of Elgin, in the county of Kane and State of Illinois, have invented certain new and useful Improvements in Apparatus for Melting and Purifying Butter and Fats, of which the following is a specification.

This invention relates to apparatus for purifying butter and fats.

The main object of this invention is to provide an improved form of apparatus whereby butter and other fats may be melted and purified by direct contact with heated air, thereby insuring rapid, uniform, and mild heating and avoiding the possibility of giving the butter an undesirable taste by raising the same to excessive temperatures, as sometimes happens when butter is melted in vessels heated from the outside.

Further objects are to so arrange the apparatus that the purest air will come into contact with such of the butter or fat as has been longest exposed to the heating effect, to provide an improved means for insuring a thorough intermingling of the air and melted fat, and to provide means for causing continued circulation and heating of the air and also admitting of renewing the air when desired.

I accomplish these objects by the device shown in the accompanying drawings, in which—

Figure 1 is a diagrammatic representation of a butter and fat purifying apparatus in section constructed according to my invention. Fig. 2 is a section on the line 2 2 of Fig. 1, showing the transverse form of the heating-pans.

The apparatus shown in the drawings consists of a series of pans, an air-heater, and a blower, all arranged to cause butter or other fats to be melted through contact with heated air and to be spread over a large area and thoroughly mixed with air.

In the construction shown the pans 3 are arranged one above the other and are inclined alternately in opposite directions, so that each will overflow into the upper part of the pan next below. The pans are tubular and are connected at their ends by vertical passages, so as to form a continuous conduit for air. The upper pan 3 is provided with an inlet-hopper 4 near its highest end. The hopper 4 has a pair of intermeshing corrugated feed-rolls adapted to crush the lumps of butter or other fat which is fed into the hopper 4 and deliver the same to the upper pan 3. The lower end of the lowest pan 3 is arranged to discharge its contents into a tank 5.

The lower end of the conduit is connected by an air-passage with the upper end of the conduit, so as to form a continuous passage through which air may be circulated by means of a blower 6. The passage 7 between the blower 6 and the upper pan is provided with a gate or damper 8. This gate is so arranged that when it is in the position shown by full lines in Fig. 1 the blower 6 will draw air from the upper pan and merely cause repeated circulation of air through said conduit. When the gate 8 is turned to the position shown by dotted lines, the blower will take in fresh air and the gate will deflect and discharge the impure air from the upper pan.

A heater 9, comprising an air-chamber containing a plurality of heating-coils, receives air from the discharge end of the blower 6 and after heating the same delivers it to the lower pan 3 through the passage 10. The air-inlet 11 is located above the liquid-outlet 12 of the lowest pan 3, as indicated in Fig. 1, so as to prevent the melted fat from running into the heater. The upper pan 3 is provided with a wall 13, which prevents the fat from being carried into the passage 7 by the current of air.

The hopper 4, from which the masses of butter or fat are fed to the upper pan 3, is provided with corrugated intermeshing rollers 14, which are driven in opposite directions, as shown by the small arrows in Fig. 1. The driving mechanism for these rollers is omitted from the drawings. The rollers 14 have the effect of crushing the large masses of butter and delivering the same to the pans in the form of small particles which will rapidly melt in the heated air passing along the pans.

The air after being heated by the heater 9 passes through the passage 10 into the lower end of the series of pans 3. The butter and fat becoming melted spread thinly over the bottom of the pans 3 and flow along the pans, dripping from each pan to the next below at the ends of the pan. There is thus a thin film or stream of molten butter at 15 near the bottom of each of the vertical passages 16, connecting the adjacent ends of the pans.

The air forces its way through this film and also comes in direct contact with the surface of the melted fat during its passage along the pans and in this way removes all impurities that can be removed by oxidation. The air is forced along the series of pans in a direction opposite to the flow of the melted fat, for the reason that when the fat is first delivered to the pans the principal action of the heated air to is melt the fat. The fat on approaching the lower end of the series of pans after having been continuously treated to the action of the air finally comes into contact with the purest air, which is just entering the pans and which is most efficient for removing impurities. The fat is thus freed of all of the impurities which can be removed by heating and aeration. The pans are preferably broad in proportion to their depth, so that the melted fat will spread in a thin layer across the bottom of the pans and become thoroughly exposed to the action of the air during its passage along the pans. The purified fat is delivered by the spout 17 to the tank 5.

When the gate 8 is in the position shown by dotted lines in Fig. 1, fresh air will enter the opening 18 and be forced by the pump 6 into contact with the heating-coils and then through the series of pans and will finally be discharged at 19 after having treated the fat in the pans. The room which incloses the pump should also be provided with one or more openings 20 for the admission of fresh air and the discharge of exhausted air. When the gate 8 is in the closed position, (shown by full lines in Fig. 1,) then the air after having passed through the series of pans is again directed to the heating-coils, where it is reheated and again passed through the pans. In this way the air may be used over and over. Fresh air may then be admitted by turning the gate 8 to the dotted position whenever the air has exhausted its activity as a purifying agent. In this way much heat may be saved. The heat radiated from the pans will heat the room inclosing the pans and tank 5, so that the butter or fat in said tank will remain in the liquid state.

What I claim as my invention, and desire to secure by Letters Patent, is—

1. A butter or fat melting and purifying apparatus comprising an inclined tubular conduit open at its ends, a hopper for feeding fatty particles to the upper end of said conduit, a pair of longitudinally-corrugated rollers meshing with each other and closing the throat of said hopper and adapted to control the discharge thereof, a passage connecting the upper and lower ends of said conduit, an air-heater in said passage, means for causing air from said heater to flow along the conduit into contact with its contents, and a receptacle for receiving the molten fat at the lower end of the conduit.

2. The combination of a series of horizontally-disposed closed pans arranged one above the other and adapted to hold butter or fat, each of said pans being slightly inclined and connected at its lower end with the next succeeding pan to form a closed conduit, and means for causing heated air to flow along said conduit for melting and purifying the contents of the pans, an air-passage connecting the lower end of the lowest pan with the upper end of the uppermost pan, a blower in said passage for causing a circulation of air along the pans, a heater for heating said air, and means for admitting fresh air and discharging impure air at the upper part of said passage.

Signed at Chicago this 13th day of September, 1905.

CHARLES DALLAS MONROE.

Witnesses:
 EUGENE A. RUMMLER,
 GLEN C. STEPHENS.